United States Patent
Gerst et al.

(10) Patent No.: US 9,605,188 B2
(45) Date of Patent: Mar. 28, 2017

(54) AQUEOUS POLYMER DISPERSION SUITABLE FOR APPLICATION AS TACKIFIER FOR ADHESIVES AND PREPARABLE BY EMULSION POLYMERIZATION BASED ON C1 TO C20 ALKYL (METH)ACRYLATES

(71) Applicant: BASF SE, Ludwigshafen (DE)

(72) Inventors: Matthias Gerst, Maikammer (DE); Michael Gross, Mannheim (DE)

(73) Assignee: BASF SE, Ludwigshafen (DE)

( * ) Notice: Subject to any disclaimer, the term of this patent is extended or adjusted under 35 U.S.C. 154(b) by 251 days.

(21) Appl. No.: 13/758,493

(22) Filed: Feb. 4, 2013

(65) Prior Publication Data
US 2013/0202886 A1 Aug. 8, 2013

Related U.S. Application Data

(60) Provisional application No. 61/595,166, filed on Feb. 6, 2012.

(51) Int. Cl.
| | | |
|---|---|---|
| *C09J 133/12* | (2006.01) | |
| *C09J 7/02* | (2006.01) | |
| *C09J 133/02* | (2006.01) | |

(52) U.S. Cl.
CPC ........... *C09J 133/12* (2013.01); *C09J 7/0217* (2013.01); *C09J 133/02* (2013.01); *C08L 2201/54* (2013.01); *Y10T 428/2891* (2015.01)

(58) Field of Classification Search
CPC ........... C08L 2201/54; C08L 2205/025; C09J 133/02; C09J 133/0412; C09J 7/0217; Y10T 428/2891; C08F 2/16; C08F 2/22; C08F 2/38
See application file for complete search history.

(56) References Cited

U.S. PATENT DOCUMENTS

| | | | |
|---|---|---|---|
| 4,501,845 A * | 2/1985 | Baus ................. | C08F 2/38 524/458 |
| 4,593,081 A * | 6/1986 | Bobsein et al. ............. | 526/211 |
| 5,100,963 A * | 3/1992 | Lin ...................... | C08L 33/08 525/221 |
| 5,196,504 A | 3/1993 | Scholz et al. | |
| 5,461,103 A | 10/1995 | Bafford et al. | |
| 5,800,873 A | 9/1998 | Enthoven et al. | |
| 6,124,417 A | 9/2000 | Su | |
| 6,214,925 B1 | 4/2001 | Schuler et al. | |
| 6,469,118 B1 | 10/2002 | Su | |
| 2002/0055587 A1* | 5/2002 | Lau et al. ........................ | 525/81 |
| 2006/0100357 A1* | 5/2006 | Bunn ..................... | C09J 133/04 524/556 |
| 2006/0142493 A1* | 6/2006 | Hughes et al. ............... | 525/210 |
| 2006/0223935 A1* | 10/2006 | Fasano .................. | C08F 220/18 524/501 |
| 2010/0003442 A1* | 1/2010 | Even ...................... | C08L 33/08 428/41.3 |

FOREIGN PATENT DOCUMENTS

| | | | |
|---|---|---|---|
| JP | 63235356 A | * | 9/1988 |
| JP | 2004002525 A | * | 1/2004 |
| WO | WO 2005/047342 A1 | | 5/2005 |

OTHER PUBLICATIONS

JP 63235356 A, Sep. 1988, Derwent Ab.*
JP 2004002525 A, Jan. 2004, Machine translation.*
International Search Report and Written Opinion of the International Searching Authority Issued Mar. 20, 2013 in PCT/EP2013/051188 (with English translation of Categories of Cited Documents).

* cited by examiner

*Primary Examiner* — Satya Sastri
(74) *Attorney, Agent, or Firm* — Oblon, McClelland, Maier & Neustadt, L.L.P.

(57) ABSTRACT

Described is an aqueous dispersion comprising at least one polymer dispersed in water and having a weight-average molecular weight of less than 50 000 and a glass transition temperature of −40° C. to 0° C., preparable by emulsion polymerization in the presence of at least one chain transfer agent of a monomer mixture comprising at least 40% by weight of C1 to C20 alkyl (meth)acrylates, 0% to 30% by weight of vinylaromatics, at least 0.1% by weight of acid monomers, and 0% to 50% by weight of further monomers. The dispersion can be used in particular as a tackifier for adhesives.

19 Claims, No Drawings

AQUEOUS POLYMER DISPERSION SUITABLE FOR APPLICATION AS TACKIFIER FOR ADHESIVES AND PREPARABLE BY EMULSION POLYMERIZATION BASED ON C1 TO C20 ALKYL (METH)ACRYLATES

The invention relates to an aqueous dispersion comprising at least one polymer dispersed in water and having a low molecular weight and a defined glass transition temperature, preparable by emulsion polymerization, in the presence of at least one chain transfer agent, of a monomer mixture comprising C1 to C20 alkyl (meth)acrylates, acid monomers, and optionally vinylaromatics, and also further monomers. The invention also relates to uses of the dispersion, as tackifiers for adhesives, for example.

With pressure-sensitive adhesives (PSAs) there is a desire not only for effective adhesion to the substrate but also for sufficient internal strength in the layer of adhesive (cohesion). Adhesion and cohesion are mutually opposed performance properties. Measures which bring about an improvement in adhesion tend to lead at the same time to a deterioration in cohesion, and vice versa. Many PSA polymers, while having sufficiently high cohesion, nevertheless lack sufficient adhesion. By adding what are called tackifiers it is possible to achieve a significant increase in the adhesion of adhesive compositions. Tackifiers are polymeric additives for adhesive polymers or, generally, for elastomers, which increase the autoadhesion (tack, intrinsic adhesiveness, self-adhesion) of said polymers or elastomers, so that after brief and gentle application of pressure, the systems adhere firmly to surfaces. Tackifiers commonly employed include natural resin-based tackifiers, terpene oligomers, coumarone-indene resins, aliphatic petrochemical resins, and modified phenolic resins. In the case of resins from natural sources, the naturally fluctuating availability and price may present problems. In the case of synthetic resins which are said to be useful as tackifiers for aqueous PSA polymer dispersions, a good molecular miscibility of a portion or of the total amount in the dried film of adhesive is as important as a high compatibility with aqueous polymer dispersions. Good miscibility in polymer films is promoted by a molecular weight which is extremely low. In the case of synthetic tackifier polymers or oligomers, a problem is that in order to achieve low molecular weights, it is necessary at the preparation stage to use relatively high quantities of chain transfer agents. This can lead to a relatively high level of unpolymerized residual monomers, which on the one hand is frequently undesirable from the product safety aspect and on the other hand may, like an inadequate molecular weight on the part of the polymers, have a strongly plasticizing effect on the adhesive polymers, which may lead to an undesirably strong adverse effect on the cohesion. Using low molecular weight polyacrylates as tackifiers for adhesive formulations is referred to in WO 2005/047342, for example. One example of a commercial product of this kind is Acronal® A107 (former name: Acronal® 7 D). Adhesive formulations produced therewith possess good tack and adhesion. For certain applications, however, they are too "soft"; in other words, the cohesion is inadequate.

It was an object of the present invention to provide substances which are suitable as tackifiers for aqueous PSA dispersions and with which it is possible to optimize the adhesive properties of PSAs, in particular for self-adhesive articles such as adhesive labels, adhesive sheets or adhesive tapes, and also flooring adhesives. In particular, in addition to good adhesion, extremely good cohesion ought to be achieved at the same time. Found accordingly have been the aqueous polymer dispersions described in more detail below, based on defined, synthetic acrylate polymers of low molecular weight.

The invention provides an aqueous dispersion comprising at least one polymer dispersed in water and having a weight-average molecular weight of less than 50 000 and a glass transition temperature of greater than or equal to −40° C. to less than or equal to 0° C., preferably greater than or equal to −35° C. to less than or equal to 0° C., preparable by emulsion polymerization in the presence of at least one chain transfer agent and preparable from a monomer mixture comprising (a) at least 40% by weight of at least one C1 to C20 alkyl (meth)acrylate,
(b) 0% to 30% by weight of at least one vinylaromatic,
(c) at least 0.1% by weight of at least one acid monomer,
(d) 0% to 50% by weight of further monomers, the figures for the monomer amounts being based in each case on the sum of all the monomers.

The dispersion of the invention comprises as an essential constituent a polymer which is preparable by emulsion polymerization; the dispersed polymer is then an emulsion polymer. The term "polymer" hereinafter encompasses not only (low molecular weight) polymers but also oligomers.

The polymers can be prepared by conventional emulsion polymerization using unusually large amounts of chain transfer agents. The resulting tackifier dispersions can then be blended, as a blend component, with adhesive polymers to form PSA dispersions. Instead of their use as a blend component, the tackifier dispersions may also be prepared in situ by a staged procedure by the emulsion polymerization of a PSA dispersion in the presence of an adhesive polymer.

In the text below, the term "(meth)acrylate" and similar designations are used as an abbreviated notation for "acrylate or methacrylate".

A pressure-sensitive adhesive (PSA) is a viscoelastic adhesive whose set film at room temperature (20° C.) in the dry state remains permanently tacky and adhesive. Adherence to substrates is accomplished immediately by gentle application of pressure. A PSA dispersion is a composition which comprises a polymer, dispersed in water or in aqueous medium, that has pressure-sensitive adhesive properties.

An adhesive polymer in the sense of the invention is a polymer having a glass transition temperature in the range from −60° C. to −20° C.

The glass transition temperature of polymers can be determined by differential scanning calorimetry (ASTM 3418/82, 20 k/min, midpoint temperature).

A tackifier is a polymeric or oligomeric additive for adhesive polymers or, generally for elastomers that increases the autoadhesion (tack, inherent adhesiveness, self-adhesion) of such systems, so that they adhere firmly to surfaces after brief and gentle applied pressure.

The candidate tackifier polymer is composed to an extent of at least 40% by weight, more particularly from 60% to 99.9% by weight or from 60% to 99.7% by weight or from 70% to 98% by weight, of at least one C1 to C20 alkyl (meth)acrylate. C1 to C10 alkyl acrylates and C1 to C10 alkyl methacrylates are preferred. Examples of suitable monomers include methyl methacrylate, methyl acrylate, n-butyl acrylate, ethyl acrylate, ethyl methacrylate, n-hexyl acrylate, octyl acrylate, and 2-ethylhexyl acrylate. In particular, mixtures of the (meth)acrylic acid alkyl esters are also suitable. Especially preferred are 2-ethylhexyl acrylate, n-butyl acrylate, and methyl methacrylate.

The candidate tackifier polymer may optionally be composed of vinylaromatics. The vinylaromatic monomers (b) may be used in amounts of 0% to 30% by weight, more particularly of 0.5% to 25% by weight or of 2% to 20% by weight, based on the total amount of monomers. Preferred vinylaromatics are those having up to 20 C atoms. Vinylaromatic compounds contemplated include vinyltoluene, alpha- and para-methylstyrene, alpha-butylstyrene, 4-n-butylstyrene, 4-n-decylstyrene, and—preferably—styrene.

The candidate tackifier polymer is formed to an extent of at least 0.1% by weight, preferably in amounts of 0.1% to 20% by weight, more preferably 0.2% to 10% by weight, very preferably 0.5% to 7% by weight, based on the total amount of monomers, from acid monomers. Acid monomers are ethylenically unsaturated, radically polymerizable monomers which have at least one acid group. Examples of acid monomers include ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids that have 3 to 6 C atoms in the molecule. Examples thereof are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate, and sulfopropyl methacrylate. The acid monomers are preferably selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, and sulfopropyl methacrylate, and mixtures of these monomers. Particularly preferred are acrylic acid and methacrylic acid and a mixture thereof.

The candidate tackifier polymer may optionally be composed of further monomers (d), different from the monomers (a) to (c). The further monomers (d) are used preferably in amounts of 0% to 50% by weight, more particularly of 0.1% to 40% by weight, or of 1% to 30% by weight, based on the total amount of monomers. The further monomers (d) may be selected from C1 to C20 hydroxyalkyl (meth)acrylates, vinyl esters of carboxylic acids comprising up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. Examples of vinyl esters of carboxylic acids having 1 to 20 C atoms are vinyl laurate, vinyl stearate, vinyl propionate, Versatic acid vinyl esters, and—preferably—vinyl acetate. Examples of nitriles are acrylonitrile and methacrylonitrile. The vinyl halides are chlorine-, fluorine- or bromine-substituted, ethylenically unsaturated compounds, preferably vinyl chloride and vinylidene chloride. Examples of vinyl ethers include vinyl methyl ether and vinyl isobutyl ether. Preferred vinyl ethers are those of alcohols comprising 1 to 4 C atoms. Hydrocarbons having 2 to 8 C atoms and one or two olefinic double bonds include ethylene, propylene, isoprene, and chloroprene. Particularly preferred as further monomers are methyl acrylate, methyl methacrylate, ethyl acrylate C1-C10-hydroxyalkyl (meth)acrylates, and (meth)acrylamide, and also mixtures of these monomers.

In one embodiment of the invention the polymer is preparable from a monomer mixture comprising
(a) 60% to 99.7% by weight of at least one C1 to C10 alkyl (meth)acrylate,
(b) 0% to 30% by weight of styrene,
(c) 0.2% to 20% by weight of at least one acid monomer selected from acrylic acid and methacrylic acid,
(d) 0.1% to 30% by weight of further monomers selected from C1 to C10 hydroxyalkyl (meth)acrylates and vinyl acetate, the figures for the monomer amounts being based in each case on the sum of all the monomers.

The polymer is prepared in the presence of at least one chain transfer agent in order to achieve the low molecular weight in accordance with the invention. The amount of chain transfer agent used in this case is established such that the weight-average molar mass is less than 500 000, preferably from 1500 to 45 000 or from 2000 to 20 000. Typical amounts of chain transfer agent are, for example, at least 1 part by weight, preferably more than 1 part by weight, as for example 2 to 30 parts by weight, per 100 parts by weight of monomers.

The chain transfer agents are generally low molecular weight compounds with a molar weight of less than 2000, more particularly of less than 1000 g/mol. Examples of chain transfer agents include organic compounds comprising sulfur in bonded form, more particularly compounds having a thiol or sulfide group such as alkyl mercaptans, thiocarboxylic acids, thiocarboxylic esters, mercaptoalkanols, mercaptoalkyltrialkoxysilanes, thioglycols, dialkyl sulfides, diaryl sulfides, dialkyl disulfides or thiourea. Examples are tert-butyl mercaptan, tert-dodecyl mercaptan, thioglycolic acid ethylhexyl ester, mercaptoethanol, mercaptopropyltrimethoxysilane, thiodiglycol, ethylthioethanol, di-n-butyl sulfide, di-n-octyl sulfide, diphenyl sulfide, diisopropyl disulfide, 1,3-mercaptopropanol, 3-mercaptopropane-1,2-diol, 1,4-mercaptobutanol, thioglycolic acid, 3-mercaptopropionic acid, mercaptosuccinic acid, thioacetic acid, and thiourea. The chain transfer agent is preferably selected form the group consisting of tert-dodecyl mercaptan, n-dodecyl mercaptan, and (2-ethylhexyl) thioglycolate. Particularly preferred is (2-ethylhexyl) thioglycolate (EHTG).

The nature and amounts of the monomers and of the at least one chain transfer agent are established such that the glass transition temperature (Tg) of the polymer is greater than or equal to −40° C., preferably greater than or equal to −35° C., to less than or equal to 0° C. The Tg here is the Tg actually measurable, which may differ from the theoretical Tg calculable using the equation known as the Fox equation. The theoretical Tg of the polymer, calculated using the Fox equation for a polymerization without chain transfer agent, is preferably greater than −25° C. It is also preferred for the theoretical Tg calculated using the Fox equation to be greater than the Tg actually measured for the polymer. The difference of theoretical Tg minus actual Tg is more preferably greater than 3° C., more particularly greater than 5° C. The glass transition temperature can be determined by differential scanning calorimetry (e.g., ASTM 3418/82, K/min, midpoint temperature).

The theoretical Tg can be calculated using the Fox equation. The theoretical glass transition temperature Tg here means the limit value of the glass transition temperature toward which it tends with increasing molecular weight. According to Fox (T. G. Fox, Bull. Am. Phys. Soc. 1956 [Ser. II] 1, page 123 and according to Ullmann's Encyclopädie der technischen Chemie, Volume 19. page 18, 4th edition, Verlag Chemie, Weinheim, 1980), the glass transition temperature of copolymers with no more than a very low degree of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n, and $T_g^1, T_g^2, \ldots T_g^n$ are the glass transition temperatures of the polymers composed in each case only of one of the monomers 1, 2, ... n, in degrees Kelvin. The $T_g$ values for the homopolymers of the majority of monomers are known and are listed for example in Ullmann's Encyclopedia of Industrial Chemistry, Volume 5, Volume A21, page 169, VCH Weinheim, 1992; other sources of glass transition temperatures for homopolymers include, for example, J. Brandrup, E. H. Immergut, Polymer Handbook, 1st Ed., J. Wiley, New York 1966, 2nd Ed., J. Wiley, New York 1975, and 3rd Ed., J. Wiley, New York 1989).

The polymers may be prepared by emulsion polymerizaztion, and are then emulsion polymers, with the abovementioned ethylenically unsaturated, radically polymerizable monomers being polymerized by radically initiated emulsion polymerization in water. In order to assist the dispersal of the monomers in the aqueous medium, it is possible to use the emulsifiers and/or protective colloids that are customarily used as dispersants.

A comprehensive description of suitable protective colloids is found in Houben-Weyl, Methoden der organischen Chemie, Volume XIV/1, Makromolekulare Stoffe [Macromolecular Compounds], Georg-Thieme-Verlag, Stuttgart, 1961, pages 411 to 420. Emulsifiers contemplated include anionic, cationic, and nonionic surface-active compounds, whose number-average molecular weight is typically below 2000 g/mol or preferably below 1500 g/mol, whereas the number-average molecular weight of the protective colloids is above 2000 g/mol, from 2000 to 100 000 g/mol for example, more particularly from 5000 to 50 000 g/mol. It is preferred to use anionic and nonionic emulsifiers as surface-active substances. Examples of suitable emulsifiers include ethoxylated $C_8$ to $C_{36}$ fatty alcohols having a degree of ethoxylation of 3 to 50, ethoxylated mono-, di-, and tri-$C_4$ to $C_{12}$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Examples of cationic emulsifiers are compounds having at least one amino or ammonium group and at least one C8-C22 alkyl group. If emulsifiers and/or protective colloids are among the auxiliaries used for dispersing the monomers, the amounts thereof that are used are, for example, 0.1% to 5% by weight, based on the monomers. Emulsifier trade names include, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, Emulphor NPS 25. The surface-active substance is used typically in amounts of 0.1% to 10% by weight, based on the monomers to be polymerized.

In emulsion polymerization it is usual to use water-soluble initiators for the radical polymerization of the monomers. Water-soluble initiators for emulsion polymerization are, for example, ammonium salts and alkali metal salts of peroxydisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems are composed of at least one, usually inorganic, reducing agent and one organic or inorganic oxidizing agent. The oxidizing component comprises, for example, the emulsion polymerization initiators already identified above. The reducing component comprises, for example, alkali metal salts of sulfurous acid, such as, for example, sodium sulfite, sodium hydrogensulfite, alkali metal salts of disulfurous acid such as sodium disulfite, bisulfate addition compounds with aliphatic aldehydes in ketones, such as acetone bisulfate, or reducing agents such as hydroxymethanesulfinic acid and its salts, or ascorbic acid. The redox initiator systems can be used along with soluble metal compounds whose metallic component is able to exist in a plurality of valence states. Examples of typical redox initiator systems include ascorbic acid/iron(II) sulfate/sodium peroxidisulfate, tert-butyl hydroperoxide/sodium disulfite, and tert-butyl hydroperoxide/Na-hydroxymethanesulfinic acid. The individual components, for example, the reducing component, may also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. Generally speaking, the concentration is 0.1% to 30% by weight, preferably 0.5% to 20% by weight, more preferably 1.0% to 10% by weight, based on the solution. The amount of the initiators is generally 0.1% to 10% by weight, preferably 0.5% to 5% by weight, based on the monomers to be polymerized. It is also possible to use two or more different initiators in the emulsion polymerization.

The emulsion polymerization takes place in general at 30 to 130, preferably 50 to 90° C. The polymerization medium may be composed either of water alone or of mixtures of water and water-miscible liquids such as methanol, ethanol or tetrahydrofuran. It is preferred to use just water. In the polymerization it is also possible, for a more effective establishment of the particle size, for example, to include a polymer seed in the initial charge.

The manner in which the initiator is added to the polymerization vessel in the course of the radical aqueous emulsion polymerization is known to a person of ordinary skill in the art. It may be included in its entirety in the initial charge to the polymerization vessel, or else introduced continuously or in stages in accordance with its consumption in the course of the radical aqueous emulsion polymerization. In each individual case, this will be dependent on the chemical nature of the initiator system and also on the polymerization temperature. It is preferred to include a part in the initial charge and to supply the remainder to the polymerization zone at the rate at which it is consumed. The chain transfer agent as well may be included in part in the initial charge or added wholly or partly during the polymerization or toward the end of the polymerization.

The monomers are preferably added at least partly continuously during the polymerization. In part it is also possible for monomers to be included in the initial charge in the polymerization vessel before the beginning of the polymerization. It is preferred to include not more than 30% by weight of the total amount of the monomers, more preferably not more than 20% by weight, very preferably not more than 10% by weight of the monomers, in the initial charge in the polymerization vessel. The remaining monomers—that is, preferably, at least 70% by weight, more preferably at least 80% by weight, very preferably at least 90% by weight—are added continuously during the polymerization. In one particular embodiment no monomers are included in the initial charge—in other words, the total amount of the monomers is run in during the polymerization. The individual components can be added to the reactor, in the case of the feed process, from above, in the side or from below, through the reactor bottom.

In order to remove the residual monomers it is also possible to add further initiator (chemical deodorization) after the end of the emulsion polymerization proper, i.e., after a conversion of all the monomers. In the case of the emulsion polymerization, aqueous dispersions of the polymer are obtained in general with solids contents of 15% to 75% by weight, preferably of 40% to 75% by weight. The polymer thus prepared is used preferably in the form of its aqueous dispersion.

The size distribution of the dispersion particles may be monomodal, bimodal or multimodal. In the case of monomodal particle size distribution, the average particle size of the polymer particles dispersed in the aqueous dispersion is preferably smaller than 400 nm, more particularly smaller than 300 nm. With particular preference the average particle size is situated between 140 and 300 nm. By average particle size here is meant the $d_{50}$ of the particle size distribution, i.e., 50% by weight of the total mass of all particles have a smaller particle diameter than the $d_{50}$. The particle size distribution can be determined in a known way using the analytical ultracentrifuge (W. Mächtle, Makromolekulare Chemie 185 (1984), pages 1025-1039). In the case of bimodal or multimodal particle size distribution, the particle size may amount to up to 1000 nm. The pH of the polymer dispersion is established preferably at a level of greater than 4.5, more particularly at a level of between 5 and 8.

The invention also provides an adhesive dispersion, i.e., an aqueous dispersion which in addition to the low molecular weight polymer described above comprises at least one dispersed adhesive polymer. The adhesive polymer has a greater weight-average molecular weight than the low molecular weight polymer. An adhesive polymer for the purposes of the invention is a polymer having a glass transition temperature in the range from −60° C. to −20° C. The glass transition temperature of the polymer is preferably greater than the glass transition temperature of the adhesive polymer, more particularly greater by at least 1° C. or by at least 2° C.

In the adhesive dispersion, the adhesive polymer is present in amounts preferably of 60% to 95% by weight, more particularly of 70% to 90% by weight, and the low molecular weight polymer is present in amounts of 5% to 40% by weight, more particularly of 10% to 30% by weight, the amounts figures being based in each case on solids content.

The adhesive polymers may be polymers obtainable by radical polymerization of ethylenically unsaturated compounds (monomers) or may be polymers obtainable by polycondensation, such as polyurethanes, for example. The adhesive polymer consists preferably to an extent of at least 40% by weight or at least 60% by weight, or at least 80% by weight, more preferably at least 90% by weight, of what are called principal monomers. The principal monomers are preferably selected from $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. Suitable adhesive polymers are more particularly poly(meth)acrylates, ethylene/vinyl acetate copolymer, polyurethanes, polyamide resins, saturated polyesters, polyolefins, styrene/butadiene block copolymers, styrene/isoprene block copolymers, polyimides, PVC, and polyvinylpyrrolidone.

Preferred adhesive polymers are (meth)acrylate polymers and vinyl acetate polymers. The (meth)acrylate polymers are formed from at least one (meth)acrylate monomer, which may be copolymerized with further monomers. The vinyl acetate polymers are formed from at least one vinyl acetate monomer, which may be copolymerized with further monomers; ethylene/vinyl acetate copolymer is an example. Suitable monomers are, for example, (meth) acrylic acid alkyl esters having a $C_1$-$C_{10}$ alkyl radical, such as methyl methacrylate, methyl acrylate, n-butyl acrylate, ethyl acrylate, and 2-ethylhexyl acrylate. In particular, mixtures of the (meth)acrylic acid alkyl esters are also suitable. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, α- and p-methylstyrene, α-butylstyrene, 4-n-butylstyrene, 4-n-decylstyrene, and—preferably—styrene. Examples of nitriles are acrylonitrile and methacrylonitrile. The vinyl halides are chlorine-, fluorine- or bromine-substituted, ethylenically unsaturated compounds, preferably vinyl chloride and vinylidene chloride. Examples of vinyl ethers include vinyl methyl ether and vinyl isobutyl ether. Preferred vinyl ethers are those of alcohols comprising 1 to 4 C atoms. Suitable hydrocarbons having 4 to 8 C atoms and two olefinic double bonds are, for example, butadiene, isoprene, and chloroprene. Hydrocarbons having 2 to 4 C atoms are, for example, ethylene, propylene or butene. Preferred principal monomers are $C_1$ to $C_{10}$ alkyl acrylates and $C_1$ to $C_{10}$ alkyl methacrylates, more particularly $C_1$ to $C_8$ alkylacrylates and methacrylates, and vinylaromatics, more particularly styrene, and mixtures thereof. Especially preferred are methyl acrylate, methyl methacrylate, ethyl acrylate, n-butyl acrylate, n-hexyl acrylate, octyl acrylate, and 2-ethylhexyl acrylate, styrene, and also mixtures of these monomers.

As well as the principal monomers, the adhesive polymer may comprise further monomers, examples being acid monomers, monomers containing hydroxyl groups, more particularly $C_1$-$C_{10}$-hydroxyalkyl (meth)acrylates, or (meth)acrylamide. Further monomers also include phenyloxyethylglycol mono(meth)acrylate, glycidyl (meth)acrylate, aminoalkyl (meth)acrylates such as, for example, 2-aminoethyl (meth)acrylate. Alkyl groups have preferably from 1 to 20 C atoms. Other further monomers include crosslinking monomers. The further monomers are used generally in minor amounts; their fraction in total is preferably below 10% by weight, more particularly below 5% by weight.

Preferred adhesive polymers of the adhesive composition are acrylate or methacrylate polymers which are formed not only of acrylic ester and/or methacrylic ester monomers but also of monomers having acid groups. The monomers having acid groups are present preferably at not less than 0.1% by weight, e.g. 0.1% to 15% by weight, preferably in amounts of 0.1% to 5%, more preferably 0.2% to 4%, very preferably 0.5% to 3% by weight, based on the total amount of monomers. Examples of monomers having acid groups are monomers having carboxylic, sulfonic or phosphonic acid groups. Carboxylic acid groups are preferred. Examples include acrylic acid, methacrylic acid, itaconic acid, maleic acid or fumaric acid. The acid groups may be present in the form of their salts.

The radically polymerized adhesive polymers may be prepared, in the same way as for the preparation of the low molecular weight polymers, by emulsion polymerization.

For preparing the adhesive dispersion it is possible to mix an aqueous dispersion which comprises no adhesive polymer but comprises the low molecular weight polymer with an aqueous dispersion that comprises an adhesive polymer. In one preferred embodiment of the invention, the above-described low molecular weight polymer is prepared in situ in the presence of the at least one adhesive polymer dispersed in water.

The adhesive dispersion of the invention is preferably a PSA dispersion and may comprise additives. The additives are selected for example from fillers, dyes, flow control assistants, thickeners, preferably associative thickeners, defoamers, plasticizers, pigments, wetting agents, UV protectants, and, optionally, other tackifiers. Preferably, however, no other tackifiers are included. For more effective wetting of surfaces, the adhesive dispersions may in particular comprise wetting assistants, examples being fatty alcohol ethoxylates, alkylphenol ethoxylates, sulfosuccinic esters, nonylphenol ethoxylates, polyoxyethylenes/propylenes or sodium dodecylsulfonates. The amount is generally 0.05 to 5 parts by weight, more particularly 0.1 to 3 parts by weight, per 100 parts by weight of polymer (solid).

The invention also provides for the use of the aqueous dispersion of the low molecular weight polymer as an additive in adhesive or coating compositions, as for example as tackifier for adhesives and more particularly for producing self-adhesive articles, more particularly for producing adhesive labels, adhesive sheets or adhesive tapes, examples being adhesive tapes for the fixing of components, especially in automobile construction, for electronics articles or in construction applications, and also for flooring adhesives.

The invention also provides self-adhesive articles obtainable by coating a carrier material with an aqueous dispersion of the invention comprising at least one adhesive polymer.

Adhesive dispersions of the invention may be used for producing adhesive articles, and self-adhesively treated articles. The adhesive article may be a label. One preferred label is a self-adhesive paper label or film label, the adhesive being applied to paper or to a film as carrier material. The adhesive article may also be an adhesive tape, where the adhesive is applied to a tapelike carrier material. The carrier material of the adhesive tape may comprise woven or nonwoven fabrics, films, paper, felts, foams, and coextrudates, or combinations of these. Fields of application are carrierless, single-sided and double-sided adhesive tapes, medical adhesive tapes, adhesive packaging tapes, cable wrapping tapes, carpet laying tapes, adhesive assembly tapes, adhesive tapes for fixing roofing felt sheets, self-adhesively treated carrier materials such as foams, for example, bitumen sheets, and the like.

For producing the adhesive articles, a layer of adhesive may be applied to the carrier material in a customary way, as for example by rolling, knifecoating, spreading, etc. Where an aqueous adhesive dispersion is used, the water may be removed by drying at 50 to 150° C., for example. The coated substrates obtained in this way are used, for example, as self-adhesive articles, such as labels, adhesive tapes or sheets. The carriers may for this purpose be slit before or after the application of the adhesive, to form adhesive tapes, labels or sheets. For the later use, the PSA-coated side of the substrates may be lined with a release paper, such as with a siliconized paper, for example.

The invention also provides an adhesive tape which has at least one carrier layer and is coated on one or both sides with at least one PSA dispersion of the invention. Preferred carrier materials for producing adhesive tapes are polyethylene (PE), oriented polypropylene (oPP), polyethylene terephtalate (PET), PE foam, and polyurethane foam (PU foam).

For the production of adhesive tapes, the application weight of the PSA dispersion, based on solids content, is preferably at least 20 g/m$^2$ or at least 30 g/m$^2$, e.g., 60 to 80 g/m$^2$.

One embodiment of the invention is an adhesive tape where the material of the carrier layer is selected from PE, oPP, PET, PE foam or PU foam and/or the adhesive tape has at least one detachable protective layer lining the layer of adhesive.

The adhesive article may be a film label or an adhesive sheet, more particularly a decorative sheet or a protective sheet, with the adhesive being applied to a polymer film carrier material. The adhesive articles are then preferably self-adhesive and consist in general of a polymeric carrier material and a layer of the adhesive applied to one or both sides, preferably one side. The carrier material may comprise, for example, transparent polymer films. The transparent polymer films may consist, for example, of polyolefins such as polyethylene or polypropylene, which may be biaxially or monoaxially oriented, or of polyesters, polyethylene terephthalate, polyvinyl chloride, polystyrene or polyamide. Especially suitable are transparent carriers, made for example of polyolefins, more particularly polyethylene or oriented polypropylene (oPP), or of polyesters. The film thickness is generally not more than 0.5 mm, preferably not more than 0.3 mm or not more than 0.2 mm. Polyethylene films may have a film thickness, for example, of 70 to 130 micrometers or of 80 to 130 micrometers. Polyethylene terephthalate films may have a film thickness, for example, of 15 to 50 micrometers or of 20 to 40 micrometers. oPP films may have a film thickness, for example, of 40 to 130 micrometers or of 50 to 100 micrometers. The transparent polymer films have a light transmission of generally at least 85%, preferably at least 88% or at least 90%, measurable for example in accordance with ASTM D 1003-07.

The aqueous polymer dispersions of the invention have very good tackifier properties when used in combination with adhesive polymers, and permit the production of adhesive articles having very good adhesive properties, particularly in relation to the combination of good adhesion and good cohesion.

EXAMPLES

Compounds Used

| AA | acrylic acid |
|---|---|
| MAA | methacrylic acid |
| AM | acrylamide |
| MMA | methyl methacrylate |
| nBA | n-butyl acrylate |
| VAc | vinyl acetate |
| EHTG | (2-ethylhexyl) thioglycolate |

Performance Tests:

The PSA dispersions were applied to Laufenberg silicone paper NSA 1370, dried, and transferred to Herma label paper (75 g/m$^2$, unprimed), to give an application rate of 18 g/m$^2$ of the dried adhesive. After conditioning of the laminates under standard conditions (23° C., 50% relative humidity) for at least 16 hours, determinations were made of the peel strength (adhesion), the shear strength (cohesion), and the quick stick at 23° C.

The PSA-coated carrier was slit into test strips 25 mm wide.

a) Quick Stick

In the determination of the quick stick (surface tack, also called loop tack), a determination is made of the force with which an adhesive applied to a carrier material by bonding without pressure on to a substrate opposes removal from the substrate at a defined removal speed. The carrier material is label paper of 75 g/m$^2$, the substrate is cardboard. A test strip in 25 mm width and 250 mm length is slit from the adhesive-coated carrier and stored under standard conditions (23° C., 50% relative humidity) for at least 16 hours. The two ends of the test strip are folded over in a length of approximately 1 cm with the adhesive side inward. A loop is formed from the adhesive strip with the adhesive side outward, and the two ends are brought together and clamped into the upper jaw of a tensile testing machine. The test substrate mount is clamped into the lower jaw, and the test substrate is inserted. The adhesive strip loop is moved downward by the tensile testing machine at a speed of 300 mm/minute, and so the adhesive side of the test strip bonds to the substrate without additional pressure. The tensile testing machine is halted and is immediately moved upward again when the bottom edge of the upper jaw is 40 mm above the substrate. The test result is reported in N/25 mm width. The maximum value on the display (Fmax) is read off as the measure of the surface tack. An average is formed from at least two individual results.

b) Shear Strength (Cohesion)

For the determination of the shear strength, the test strips were adhered to steel plate with a bonded area of 25×25 mm, rolled down once using a roller weighing 1 kg, and, after 10 minutes, loaded in suspension with a 1 kg weight. The shear strength (cohesion) was determined under standard conditions (23° C.; 50% relative humidity). The measure of the shear strength is the time in hours until the weight falls off; the average was calculated from at least 3 measurements in each case.

c) Peel Strength (Adhesion)

For the determination of the peel strength (adhesion), a test strip 25 mm wide was adhered to a cardboard test specimen and rolled down once using a roller weighing 1 kg. It was then clamped by one end into the upper jaws of a tensile strain testing apparatus. The adhesive strip was removed from the test surface at an angle of 180° and at 300 mm/min—the adhesive strip was bent around and removed parallel to the test specimen, and the expenditure of force required to achieved this was recorded. The measure of the peel strength was the force in N/25 mm which was obtained as the average value from at least two measurements. The peel strength was measured 1 minute after the bonding. After this time, the bond strength has developed fully. The test methods correspond essentially to the Finat test methods (FTM) 1, 8 and 9.

Examples

Aqueous polymer dispersions were prepared by emulsion polymerization from the components reproduced in Table 1, with the properties identified in Table 1. Additionally used in each emulsion polymerization were 1 part by weight of Disponil® FES 77 (emulsifier), 0.2 part by weight of Dowfax® 2A1, 0.4 part by weight of sodium persulfate (initiator), 0.16 part by weight of acetone bisulfite, and 0.1 part by weight of tert-butyl hydroperoxide. The solids content was approximately 52-56% by weight. The pH was adjusted to approximately 5-7.

Examples D1 to Dx are inventive, while examples C1 to Cx are noninventive, comparative examples.

TABLE 1

Components for preparing polymer dispersions and properties thereof; amounts figures in parts by weight

|  | C1 | D1 | D2 | D3 | C2 | C3 | D4 | D5 | D6 |
|---|---|---|---|---|---|---|---|---|---|
| AA | — | — | — | — | — | — | — | 5 | — |
| MAA | 1 | 1 | 1 | 1 | 1 | 1 | 1 | — | 1 |
| MMA | 49.5 | 49.5 | 49.5 | 49.5 | 79.5 | 79.5 | 79.5 | 40 | 9.5 |
| nBA | 49.5 | 49.5 | 49.5 | 49.5 | 19.5 | 19.5 | 19.5 | 55 | 89.5 |
| EHTG | 1 | 5 | 10 | 20 | 5 | 10 | 20 | 10 | 1 |
| Mw | 43400 | 8650 | 3960 | 2100 | 8220 | 4110 | 2110 | 4300 | 43100 |
| Tg [° C.] | 13 | −3 | −18.4 | −40.4 | 45 | 23.5 | −12.1 | −24 | −39 |
| Tg by Fox[1)] [° C.] | 14 | 14 | 14 | 14 | 63.3 | 63.3 | 63.3 | 7.6 | −32.9 |

|  | C4 | C5 | C7 | D7 | C8 | D8 | C9 | D9 |
|---|---|---|---|---|---|---|---|---|
| AA | — | — | — | — | — | — | — | — |
| MAA | 1 | 1 | 1 | 1 | 1 | 1 | 1 | 1 |
| MMA | 9.5 | 9.5 | 39.5 | 39.5 | 29.5 | 29.5 | 19.5 | 19.5 |
| nBA | 89.5 | 89.5 | 59.5 | 59.5 | 69.5 | 69.5 | 79.5 | 79.5 |
| EHTG | 10 | 20 | 0 | 1 | 0 | 1 | 0 | 1 |
| Mw | 4180 | 2090 | 210000 | 373000 | 280000 | 37000 | 242000 | 37300 |
| Tg [° C.] | −57 | −67 | 1 | −2 | −11 | −16 | −24 | −28 |
| Tg by Fox[1)] [° C.] | −32.9 | −32.9 | 1 | 1 | −12 | −12 | −23 | −23 |

|  | D10 | D11 | C10 | D12 | D13 | C11 |
|---|---|---|---|---|---|---|
| AA | 5 | 5 | 5 | 5 | 5 | 5 |
| VAc | — | — | — | 10 | 10 | 10 |
| MMA | 45 | 45 | 45 | 35 | 35 | 35 |
| nBA | 50 | 50 | 50 | 50 | 50 | 50 |
| EHTG | 10 | 5 | 1 | 10 | 5 | 1 |
| Mw | 3950 | 7620 | 37100 | 3960 | 7500 | 36000 |
| Tg [° C.] | −19 | −3 | 14 | −25 | −18 | 7 |
| Tg by Fox[1)] [° C.] | 14 | 14 | 14 | 9 | 9 | 9 |

TABLE 1-continued

Components for preparing polymer dispersions and properties thereof; amounts figures in parts by weight

| | D14 | D15 | D16 | D17 | D18 | D19 | D20 |
|---|---|---|---|---|---|---|---|
| MAA | 1 | 1 | 1 | 1 | 1 | 1 | 1 |
| HPA 6) | 4 | | | | | | |
| UMA 2) | 1 | 1 | 4 | | | | |
| GMA 3) | | | | 1 | 4 | | |
| DAAM 4) | | | | | | 1 | 4 |
| ADDH 5) | | | | | | 0.5 | 2 |
| MMA | 48 | 48 | 45 | 48 | 45 | 48 | 45 |
| nBA | 50 | 50 | 50 | 50 | 50 | 50 | 50 |
| EHTG | 10 | 10 | 10 | 10 | 10 | 10 | 10 |
| Mw | 4280 | 4260 | 4220 | 4260 | 4320 | 4320 | 4190 |
| Tg [° C.] | −23 | −21 | −20 | −21 | −21 | −17 | −19 |
| Tg by Fox[1)] [° C.] | 10 | | | 13.1 | 12.6 | | |

| | D21 | D22 | D23 |
|---|---|---|---|
| AA | | | 0.25 |
| MAA | 1 | 0.25 | |
| AM | | 0.5 | 0.5 |
| Styrene | 10 | | |
| MMA | 39 | 20.25 | 45 |
| nBA | 50 | 79 | 54.25 |
| EHTG | 10 | 1 | 10 |
| Mw | 4340 | ca. 40000 | ca. 15000 |
| Tg [° C.] | −23 | −28 | ca. −15 |
| Tg by Fox[1)] [° C.] | 13.4 | −22 | +7.5 |

[1)]Theoretical glass transition temperature, calculated using the Fox equation
2) UMA = ureidomethacrylate

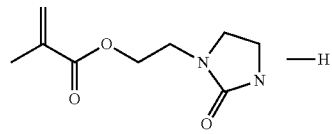

3) GMA = glycidyl methacrylate
4) N-(1,1-dimethyl-3-oxobutyl)acrylamide (diacetone acrylamide)
5) adipic dihydrazide
6) HPA = hydroxypropyl acrylate Comparative Example C6

The commercial product Acronal® A 107 was used as comparative example C6.

This product is an anionic polyacrylate (copolymer of nBA and (meth)acrylic acid).
Tg: −46° C.
Weight-average molecular weight Mw=148 000 g/mol PSA Dispersions PSA (pressure-sensitive adhesive) dispersions were prepared from in each case approximately 20 parts by weight of dispersions D1 to D21 or comparative dispersions C1 to C11 as tackifiers, approximately 80 parts by weight of Acronal® V 215 as adhesive polymer, and 0.5 part by weight of Lumiten® I-SC (wetting agent), the amounts figures being based in each case on the solids present in the respective dispersions.

The test results for quick stick, shear strength, and peel strength are summarized in Table 2.

TABLE 2

Test results for quick stick, shear strength, and peel strength

| Used | Quick stick Fmax [N/25 mm] | Shear strength [hours] | Peel strength [N/25 mm] |
|---|---|---|---|
| C1 | 1.5 | 113 | 6.3 |
| D1 | 3.4 | 63.5 | 10.8 |
| D2 | 3.9 | 49.8 | 8.8 |
| D3 | 6.9 | 20.6 | 8.8 |
| C2 | 0.7 | 40 | 2.7 |
| C3 | 1.0 | >130 | 2.5 |
| D4 | 4.0 | 84.5 | 6.5 |
| D5 | 4.3 | 33.9 | 10.3 |
| D6 | 5.5 | 15.1 | 13.9 |
| C4 | 5.2 | 6.7 | 10.3 |
| C5 | 3.9 | 6.8 | 9.5 |
| C6 | 4.4 | 3.6 | 9.8 |
| C7 | 2.8 | 96 | 5.0 |
| D7 | 4.0 | 88 | 10.1 |
| C8 | 3.0 | 98 | 6.3 |
| D8 | 5.1 | 42 | 10.3 |
| C9 | 3.5 | 87 | 7.2 |
| D9 | 5.9 | 20 | 14.1 |
| D10 | 5.0 | 30 | 13.8 |
| D11 | 2.9 | 56 | 11 |
| C10 | 0.4 | >100 | 4.2 |
| D12 | 4.9 | 30 | 12.4 |
| D13 | 4.2 | 50 | 8.9 |
| C11 | 1.4 | >100 | 5.1 |
| D14 | 4.6 | 20.1 | 14.4 |
| D15 | 5.1 | 30.1 | 12.7 |
| D16 | 4.9 | 54.3 | 15.3 |
| D17 | 5.1 | 29.5 | 11.3 |
| D18 | 4.5 | 31.2 | 13.5 |

TABLE 2-continued

Test results for quick stick, shear strength, and peel strength

| Used | Quick stick Fmax [N/25 mm] | Shear strength [hours] | Peel strength [N/25 mm] |
|---|---|---|---|
| D19 | 4.3 | >120 | 12.5 |
| D20 | 4.3 | >120 | 11.3 |
| D21 | 5.5 | 18 | 14.9 |
| D22 | 5.8 | 26.6 | 17.9 |
| D23 | 5.3 | 15.5 | 19.7 |

The results show that for C1-C3 and for C7-C11, the quick stick and peel strength values are very low. For C4, C5 and C6, the shear strength values are very low. The desire here is for shear strength values of at least 15 hours, preferably at least 20 hours.

The invention claimed is:

1. An aqueous adhesive dispersion, comprising:
a dispersed adhesive polymer; and
a tackifier polymer, dispersed in water, having a weight-average molecular weight of less than 50,000 and a glass transition temperature of greater than or equal to −40° C. to less than or equal to −2° C.,
wherein the tackifier polymer increases a tack of said adhesive polymer and is obtained by emulsion polymerization in the presence of at least one chain transfer agent and obtained from a monomer mixture consisting of:
monomer (a) at least 85% by weight of a mixture of methyl methacrylate and at least one monomer selected form the group consisting of n-butyl acrylate and 2-ethylhexyl acrylate,
monomer (b) from 0% to 14.9% by weight of a vinylaromatic,
monomer (c) at least 0.1% by weight of an acid monomer, and
monomer (d) from 0% to 14.9% by weight of at least one additional monomer selected from the group consisting of a C1 to C20 hydroxyalkyl (meth)acrylate, a vinyl ester of a carboxylic acid comprising up to 20 C atoms, an ethylenically unsaturated nitrile, a vinyl halide, a vinyl ether of an alcohol comprising 1 to 10 C atoms, an aliphatic hydrocarbon having 2 to 8 C atoms and one or two double bonds and (meth)acrylamide,
based in each case on a sum of all monomers:
and wherein the dispersed adhesive polymer is selected from the group consisting of polyurethanes, saturated polyesters, polyolefins, styrene/butadiene block copolymers, styrene/isoprene block copolymers, and polymers consisting of 40% by weight or more of a principal monomer and optionally one or more principal monomer and optionally of at least one further monomer,
wherein the principal monomer is selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one double bond, and mixtures thereof;
and wherein the further monomer is selected from the group consisting of acid monomers, monomers containing hydroxyl groups, (meth)acrylamide, phenyloxyethylglycol mono(meth)acrylate and aminoalkyl (meth)acrylates.

2. The aqueous adhesive dispersion according to claim 1, wherein the weight-average molecular weight of the tackifier polymer is from 1,500 to 45,000.

3. The aqueous adhesive dispersion according to claim 1, wherein a theoretical glass transition temperature of the tackifier polymer, calculated for a polymerization without chain transfer agent, is greater than −25° C.

4. The aqueous adhesive dispersion according to claim 1, wherein the monomer (b) is at least one selected from the group consisting of vinyltoluene, alpha-methylstyrene, para-methylstyrene, alpha-butylstyrene, 4-n-butylstyrene, and 4-n-decylstyrene.

5. The aqueous adhesive dispersion according to claim 1, wherein the monomer (c) is present in an amount of from 0.1% to 14.9% by weight and is at least one selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, and sulfopropyl methacrylate.

6. The aqueous adhesive dispersion according to claim 1, wherein the monomer (d) is present in an amount of from 0.1% to 14.9% by weight.

7. The aqueous adhesive dispersion according to claim 1, wherein the tackifier polymer is obtained from a monomer mixture consisting of:
monomer (a) from 85% to 99.7% by weight of a mixture of methyl methacrylate and at least one monomer selected form the group consisting of n-butyl acrylate and 2-ethylhexyl acrylate,
monomer (b) from 0% to 14.7% by weight of styrene,
monomer (c) from 0.2% to 14.7% by weight of at least one acid monomer selected from the group consisting of acrylic acid and methacrylic acid,
monomer (d) from 0.1% to 14.7% by weight of an additional monomer selected from the group consisting of a C1 to C10 hydroxyalkyl (meth)acrylate and vinyl acetate,
based in each case on a sum of all monomers.

8. The aqueous adhesive dispersion according to claim 1, wherein the chain transfer agent is present in an amount of at least 1 part by weight per 100 parts by weight of monomers.

9. The aqueous adhesive dispersion according to claim 1, wherein the dispersed adhesive polymer is present in an amount of from 60% to 95% by weight, and tackifier polymer is present in an amount of from 5% to 40% by weight, based in each case on solids content.

10. The aqueous adhesive dispersion according to claim 1, wherein the glass transition temperature of the tackifier polymer is greater than a glass transition temperature of the dispersed adhesive polymer.

11. A method for producing the aqueous adhesive dispersion according to claim 1, the method comprising:
mixing said tackifier polymer with said dispersed adhesive, or
preparing said tackifier polymer in the presence of said dispersed adhesive polymer.

12. A method for producing an article, the method comprising:
applying the aqueous adhesive dispersion according to claim 1 to a carrier material,
wherein the article is an adhesive label, an adhesive sheet or an adhesive tape.

13. A self-adhesive article obtained by coating a carrier material with the aqueous adhesive dispersion according to claim 1.

14. The aqueous adhesive dispersion according to claim 1, wherein said tackifier polymer is obtained in situ by a staged procedure by emulsion polymerization in the presence of the dispersed adhesive polymer.

15. A method for adhering flooring comprising:
applying the aqueous adhesive dispersion of claim 14 to a surface of a flooring material.

16. The aqueous adhesive dispersion according to claim 1, wherein said dispersed adhesive polymer has a Tg of −60 to −20° C.

17. The aqueous adhesive dispersion according to claim 1, wherein
said dispersed adhesive polymer is present in an amount of from 70% to 90% by weight, and said tackifier polymer is present in an amount of from 10% to 30% by weight, based in each case on solids content.

18. The aqueous adhesive dispersion according to claim 1, wherein said dispersed adhesive polymer is obtained by radical polymerization of ethylenically unsaturated compounds.

19. The aqueous adhesive dispersion according to claim 1, wherein said dispersed adhesive polymer is obtained by polycondensation.

* * * * *